(12) United States Patent
Keyser et al.

(10) Patent No.: US 10,351,019 B2
(45) Date of Patent: Jul. 16, 2019

(54) LINEAR POWER ACTUATOR

(71) Applicant: LEAR CORPORATION, Southfield, MI (US)

(72) Inventors: Mark R. Keyser, Lake Orion, MI (US); Curtis Hudson, Macomb, MI (US); Greg Cook, Zeeland, MI (US); Gary Holt, Southfield, MI (US)

(73) Assignee: LEAR CORPORATION, Southfield, MI (US)

( * ) Notice: Subject to any disclaimer, the term of this patent is extended or adjusted under 35 U.S.C. 154(b) by 119 days.

(21) Appl. No.: 15/646,305

(22) Filed: Jul. 11, 2017

(65) Prior Publication Data

US 2019/0016234 A1 Jan. 17, 2019

(51) Int. Cl.
*B60N 2/02* (2006.01)
*B60N 2/06* (2006.01)

(52) U.S. Cl.
CPC ........... *B60N 2/0232* (2013.01); *B60N 2/067* (2013.01); *B60N 2002/0236* (2013.01)

(58) Field of Classification Search
CPC ...... B60N 2/0232; B60N 2/02; B60N 2/0224; B60N 2/067; B60N 2/06; B60N 2002/0236
USPC ........................................................ 297/293
See application file for complete search history.

(56) References Cited

U.S. PATENT DOCUMENTS

| | | | |
|---|---|---|---|
| 5,707,035 A | 1/1998 | Kargol et al. | |
| 5,797,576 A | 8/1998 | Gareger | |
| 5,927,804 A * | 7/1999 | Cuevas | B60N 2/888 297/216.12 |
| 6,253,824 B1 * | 7/2001 | Mullet | E05F 15/603 160/188 |
| 6,305,658 B1 | 10/2001 | Kita | |
| 7,070,155 B2 | 7/2006 | Garrido et al. | |
| 2005/0253036 A1 | 11/2005 | Li et al. | |
| 2008/0100113 A1 | 5/2008 | Kropfreiter et al. | |
| 2010/0320352 A1 | 12/2010 | Weber | |
| 2013/0186217 A1 | 7/2013 | Enokijima | |
| 2014/0265991 A1 * | 9/2014 | Zhao | B60N 2/0232 318/626 |

FOREIGN PATENT DOCUMENTS

EP 2064088 6/2009

* cited by examiner

*Primary Examiner* — Mark R Wendell

(74) *Attorney, Agent, or Firm* — Brooks Kushman P.C.

(57) ABSTRACT

An actuator assembly for moving a vehicle seat on a track includes an actuation cable having a first end and a second end, an actuation gear unit having an output gear with a spool feature attached to the first end of the actuation cable, a first biasing member, and an actuator in communication with the actuation gear unit. The output gear rotates about a first axis, the actuation cable partially windable upon the spool feature. Characteristically, the actuator when actuated rotates the actuation gear unit to wind the actuation cable onto the spool feature thereby retracting the actuation cable from a first position to a second position. Advantageously, the first biasing member biases the actuation gear unit to move the actuation cable from the second position to the first position.

19 Claims, 5 Drawing Sheets

LINEAR POWER ACTUATOR

TECHNICAL FIELD

In at least on aspect, the present invention is related to a linear power actuator for moving a vehicle seat mounted on a track system.

BACKGROUND

Many vehicle seating systems include an actuator system for moving the vehicle seats. Such systems can be partially or fully driven by an electric motor. A power actuator is disclosed in U.S. Pat. No. 6,983,990.

SUMMARY

The present invention solves one or more problems in the prior art by providing in at least one embodiment, an actuator assembly for moving a vehicle seat on a track. The actuator assembly includes an actuation cable having a first end and a second end, an actuation gear unit having an output gear with a spool feature attached to the first end of the actuation cable, a first biasing member, and an actuator in communication with the actuation gear unit. The output gear rotates about a first axis, the actuation cable partially windable upon the spool feature. Characteristically, the actuator when actuated rotates the actuation gear unit to wind the actuation cable onto the spool feature thereby retracting the actuation cable such that the second end moves from a first position to a second position. Advantageously, the first biasing member biases the actuation gear unit to unwind the actuation cable and move the second end of the actuation cable from the second position to the first position.

In another embodiment, an actuator assembly for moving a vehicle seat is provided. The actuator assembly includes an actuator, an actuation cable having a first end and a second end, a worm gear that is rotated by the actuator, and a drive gear unit that has a pinion gear and a worm wheel gear that engages the worm gear. The actuator assembly also includes an actuation gear unit having an output gear with a spool feature attached to the first end of the actuation cable, a first biasing member, and an actuator in communication with the actuation gear unit. The output gear engages the pinion gear. The output gear rotating about a first axis while the drive gear unit rotates about a second axis. The actuation cable is partially windable upon the spool feature. The actuator when actuated rotates the actuation gear unit to wind the actuation cable onto the spool feature thereby retracting the actuation cable such that the second end moves from a first position to a second position. The first biasing member biases the actuation gear unit to move the actuation cable from the second position to the first position. A second biasing member is attached to the second end of the actuation cable which maintains tension in the actuation cable when the actuator assembly is installed in a vehicle with the second end of the actuation cable attached to a vehicle seat.

In another embodiment, a vehicle seating system for moving a vehicle seat on a track without a spring assist is provided. The vehicle seating system includes a first track to be fixed to a vehicle, a second track movably attached to the first track, a vehicle seat attached to the second track, and an actuator assembly fixed to the first track. The actuation assembly moves the second track relative to the first track when actuated. Advantageously, the design of the actuator assembly is set forth above.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

Figure 1:
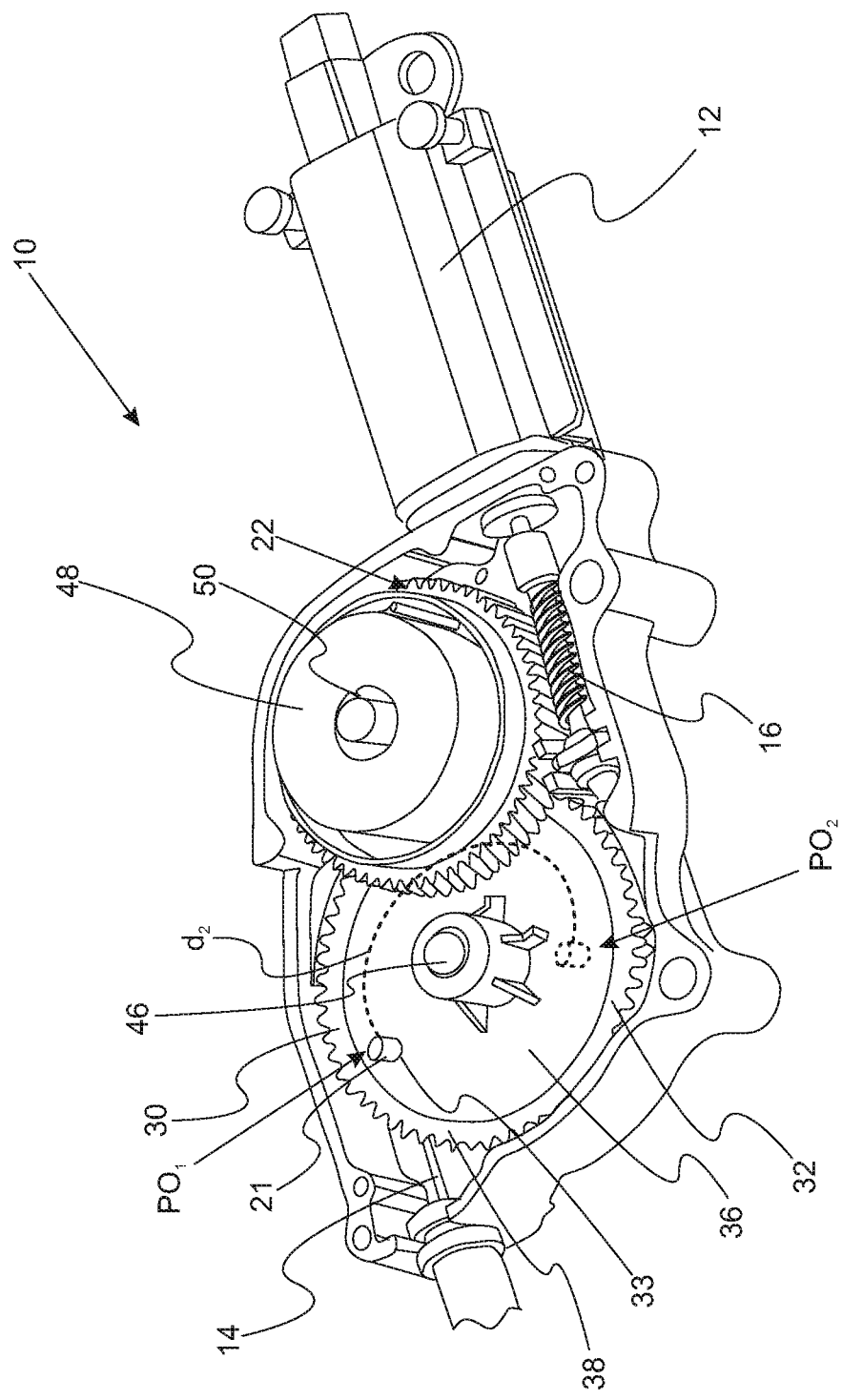
FIG. 1 is a perspective view of the linear actuator assembly with the top cover removed.
Figure 2:
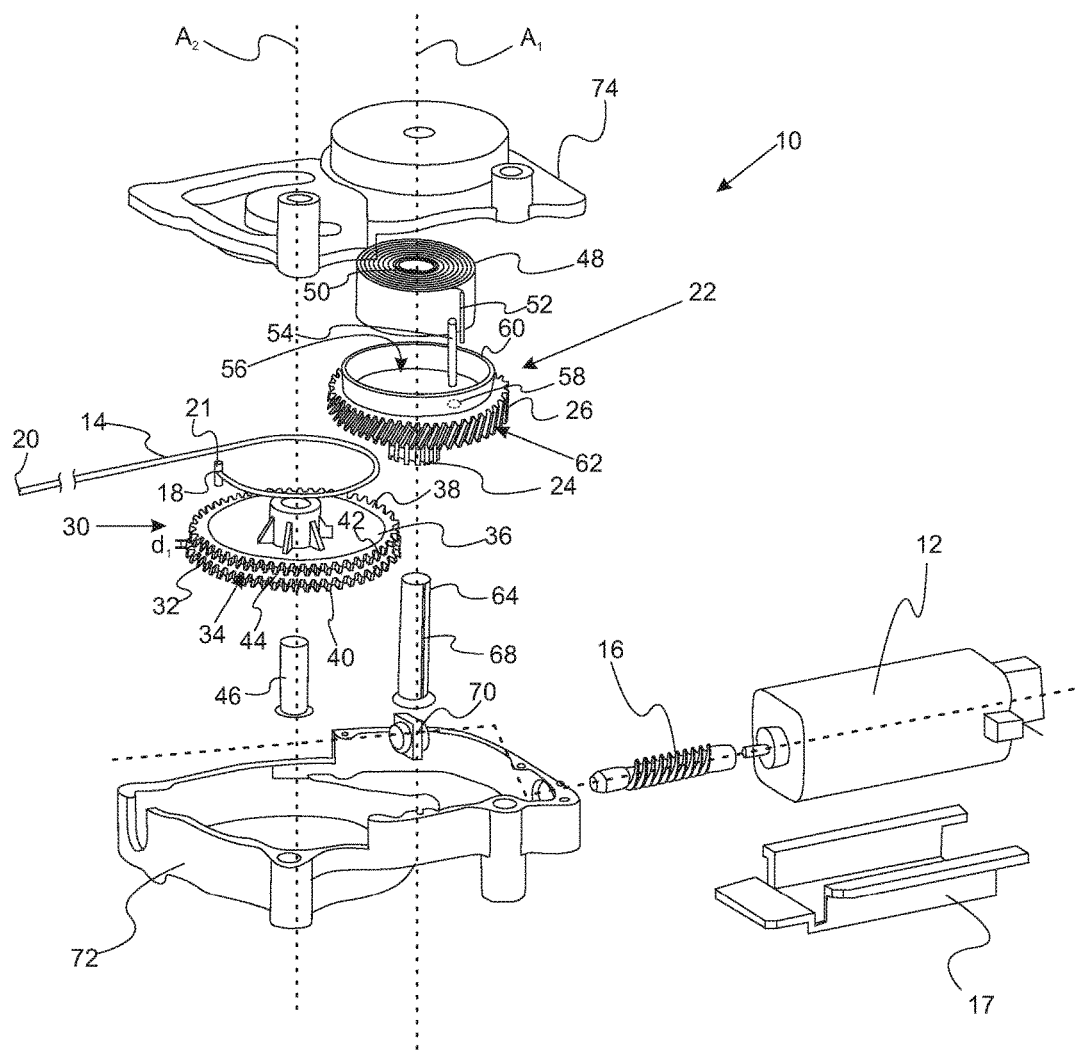
FIG. 2 is an exploded view showing the components of the linear actuator assembly.

With reference to FIGS. 1 and 2, schematic illustrations showing a linear actuator assembly that moves a vehicle seat with a track system is provided. FIG. 1 is a perspective view of the linear actuator assembly with the top cover removed. FIG. 2 is an exploded view showing the components of the linear actuator assembly. Linear power actuator assembly 10 includes an actuator 12, actuation cable 14, and worm gear 16 that is rotated by the actuator. Actuator 12 can be an AC or DC electric motor. Motor bracket 17 can be used for mounting actuator 12 on a track. Actuation cable 14 has a first end 18 and a second end 20. First end 18 includes rod-shaped end fitting 21. Drive gear unit 22 includes pinion gear 24 and a worm wheel gear 26 (a drive gear). Pinion gear 24 is attached and fixed to worm wheel gear 26 such that these gears move in unison. Worm gear 16 engages and drives worm wheel gear 26.

Still referring to FIGS. 1 and 2, drive gear unit 22 is in communication with and drives actuation gear unit 30. Actuation gear unit 30 has output gear 32 (i.e., a spur gear) with a spool feature 34 attached to the first end 18 of the actuation cable. A portion of rod-shaped end fitting 21 is positioned in and fixed to holder opening 33. Output gear 32 includes support section 36 having a peripheral edge 38 with a first set of teeth 40 and a second set of teeth 42 arranged about the peripheral edge. The first set of teeth 40 and second set of teeth 42 are separated by a predetermined distance $d_1$ to at least partially define the spool feature 34. In particular, the peripheral edge 44 defines a trench 44 flanked by the first set of teeth and second set of teeth. The trench provides the surface onto which cable 12 is wound onto or unwound from.

Still referring to FIGS. 1 and 2, linear power actuator 10 also includes first biasing member 48. First biasing member 48 includes a first biasing member end 50 and a second biasing member end 52. The second biasing member end 52 is disposed opposite to the first biasing member end 50. The motion of first biasing member 48 is partially set by pin 54 which engages and fixes the movement of biasing member end 52. The pin mount 58 may be coupled to a pin 54 that may be connected to or in contact with biasing member 48 at second biasing member end 52.

Worm wheel gear 26 has a pocket 56 that is disposed opposite the pinion gear 24 which at least partially receives the first biasing member 48. Pocket 56 is defined by rim 60 that is radially disposed about first axis $A_1$ while extending away from pinion gear 24. Pin 54 is at least partially disposed in the pocket 56. Worm wheel gear 26 has a set of drive gear teeth 62 that are arranged around the pocket 56. Drive gear unit 22 is rotatable about a first shaft 64 that has a slot 68 that receives first biasing member end 50. Drive gear unit 22 rotates about a first axis $A_1$. In a refinement, slot 68 is disposed along the first axis $A_2$.

Second biasing member 42 is attached to the second end 20 of the actuation cable. Second biasing member 42 maintains tension in the actuation cable when the actuator assembly is installed in a vehicle with the second end of the actuation cable attached to a vehicle seat. In a refinement, second biasing member 42 is a constant force spring comprising a rolled metal ribbon that is relaxed when the rolled metal ribbon is fully rolled up and wherein a restoring force is created when the rolled metal ribbon is unrolled.

Actuator 12 is in communication with actuation gear unit 30. In a variation, this communication is accomplished by actuator 12 rotating worm gear 16 which engages worm wheel gear 26 which cause both pinion gear 24 and worm wheel gear 26 to rotate. The rotation of worm gear 16 is steadied by rotation bracket 70. Worm wheel gear 26 engages output gear 32. Therefore, during operation, drive gear unit 22 rotates about a first axis $A_1$ while output gear 32 rotates about shaft 46 and therefore second axis $A_2$ such that the actuation cable partially winds upon the spool feature 34. In a refinement, output gear 32 rotates in an opposite direction to drive gear unit 22. Typically, actuator 12 is an electric motor that does not actuate the actuation gear unit to unwind. Drive gear unit 22 with its related shaft 64 and actuation gear unit 30 with its related shaft 46 are mounted in housing defined by housing section 72 and housing cover 74.

Figure 3:
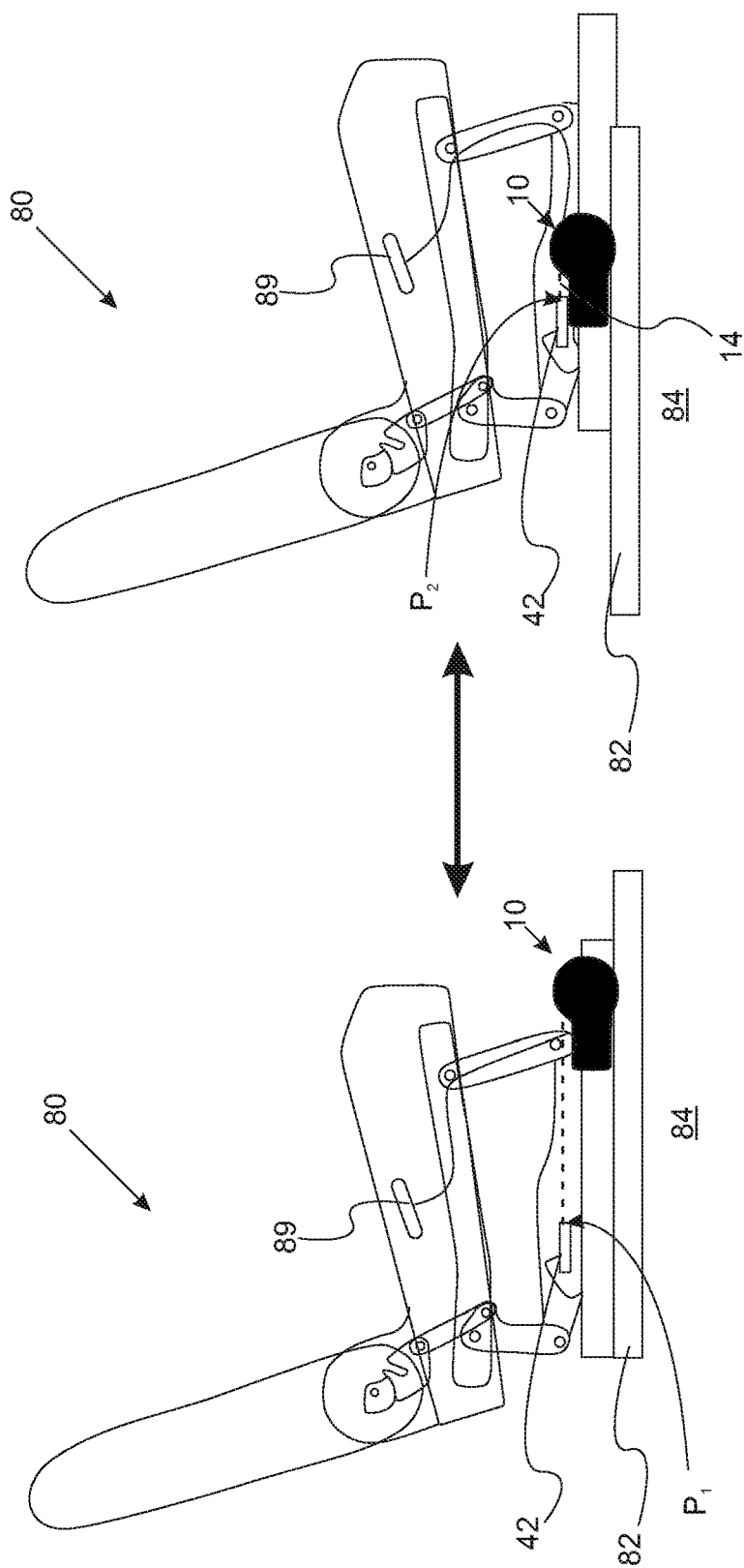
FIG. 3 is a schematic illustrating the movement of a vehicle seat using the linear actuator of FIGS. 1 and 2.

With reference to FIG. 3, actuator assembly 10 is typically integrated into a vehicle seating system. Vehicle system 80 includes a first track 82 to be fixed to a vehicle (e.g., vehicle floor 84). Second track 86 is movably attached to the first track 82. Vehicle seat 88 is attached to the second track. Actuator assembly 10 is fixed to the first track 82. Advantageously, the design of the actuator assembly is set forth above in connection with the descriptions of FIGS. 1 and 2. The actuation assembly 10 moves the second track relative to the first track when actuated. In particular, actuator 12 when actuated rotates the actuation gear unit to wind the actuation cable 14 onto the spool feature 34 thereby retracting the actuation cable 14 such that second end 20 moves from a first position $P_1$ to a second position $P_2$. User operated switch 89 which is in electrical communication with linear power actuator assembly is used to perform this actuation. Moreover, output gear 32 rotates along direction $d_2$ from position $PO_1$ to $PO_2$. Direction $d_2$ is a curved trajectory (e.g., a portion of a circular path). The distanced traverse when second end 20 moves from first position $P_1$ to second position $P_2$ can be from about 100 mm to 500 mm or more (i.e., the stroke). In a refinement, the distanced traverse when second end 20 moves from first position $P_1$ to second position $P_2$ is about 140 mm. Typically, in moving second end 20 from first position $P_1$ to second position $P_2$, actuation cable 14 moves about 140 mm. First biasing member 48 biases the actuation gear unit 30 to unwind the actuation cable (i.e., second end 20 is biased to move from the second position $P_2$ to the first position $P_1$). During this unwinding, output gear 32 rotates along direction $d_2$ from position $PO_2$ to $PO_1$. In a refinement, movement from the second position $P_2$ to the first position $P_1$ is accomplished manually by the user.

The large strong and the related high force developed by linear power actuator assembly 10 is due in the specific gear characteristics. In a refinement, worm gear 16 has single or multiple start threads. The gear ratio of wheel drive gear 26 to worn gear 16 is from about 15 to 30 with 20 being optimal. Similarly, the gear ratio of output gear 32 to pinion gear 24 is from about 3 to 8. Therefore, the total gear ratio from output gear 32 to worm gear 16 is about 45 to 160 with 100 being optimal.

Figure 4A:
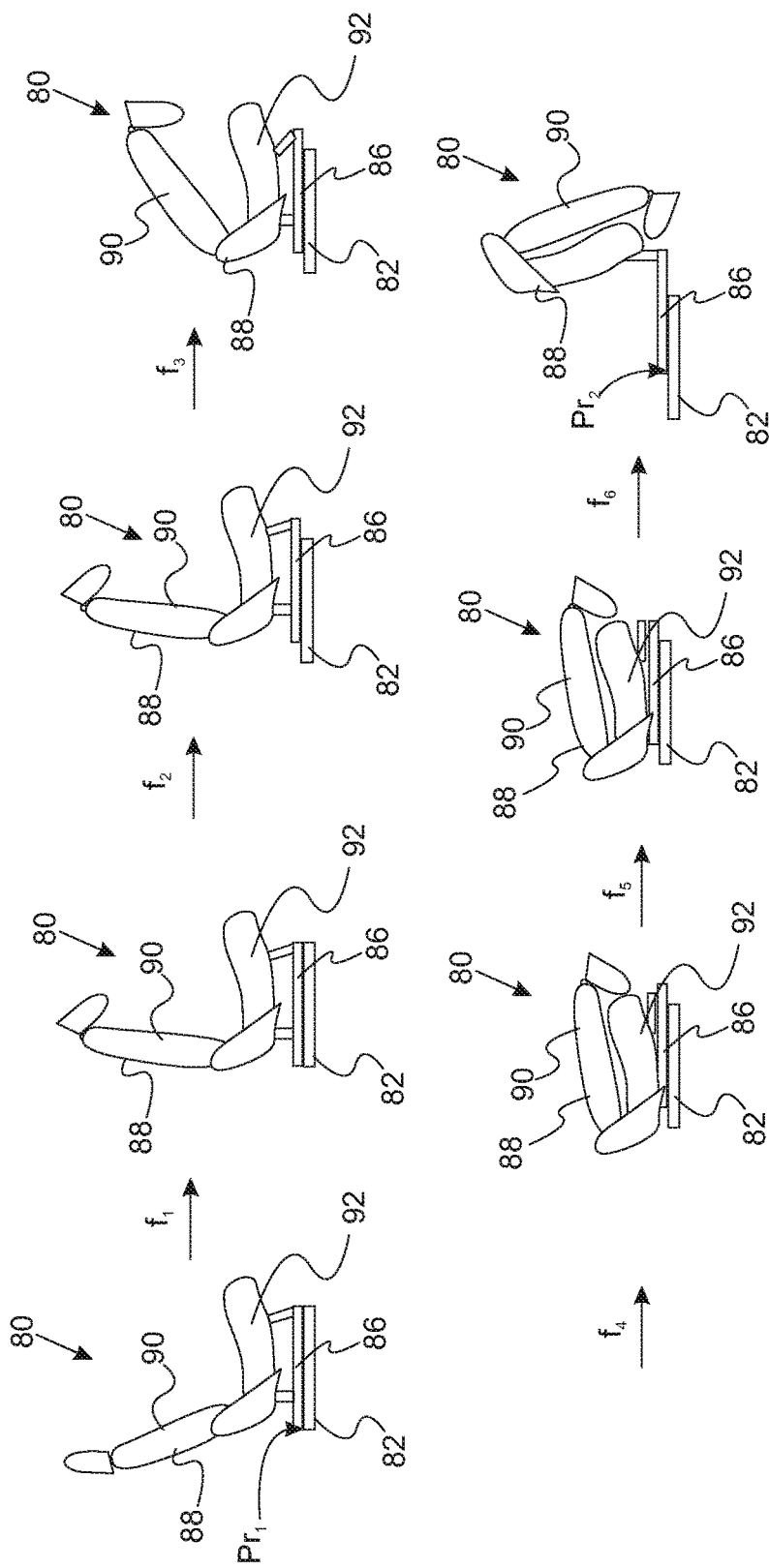
FIG. 4A is a schematic flowchart that illustrates forward motion of a rear seat using the linear actuator of FIGS. 1 and 2.
Figure 4B:
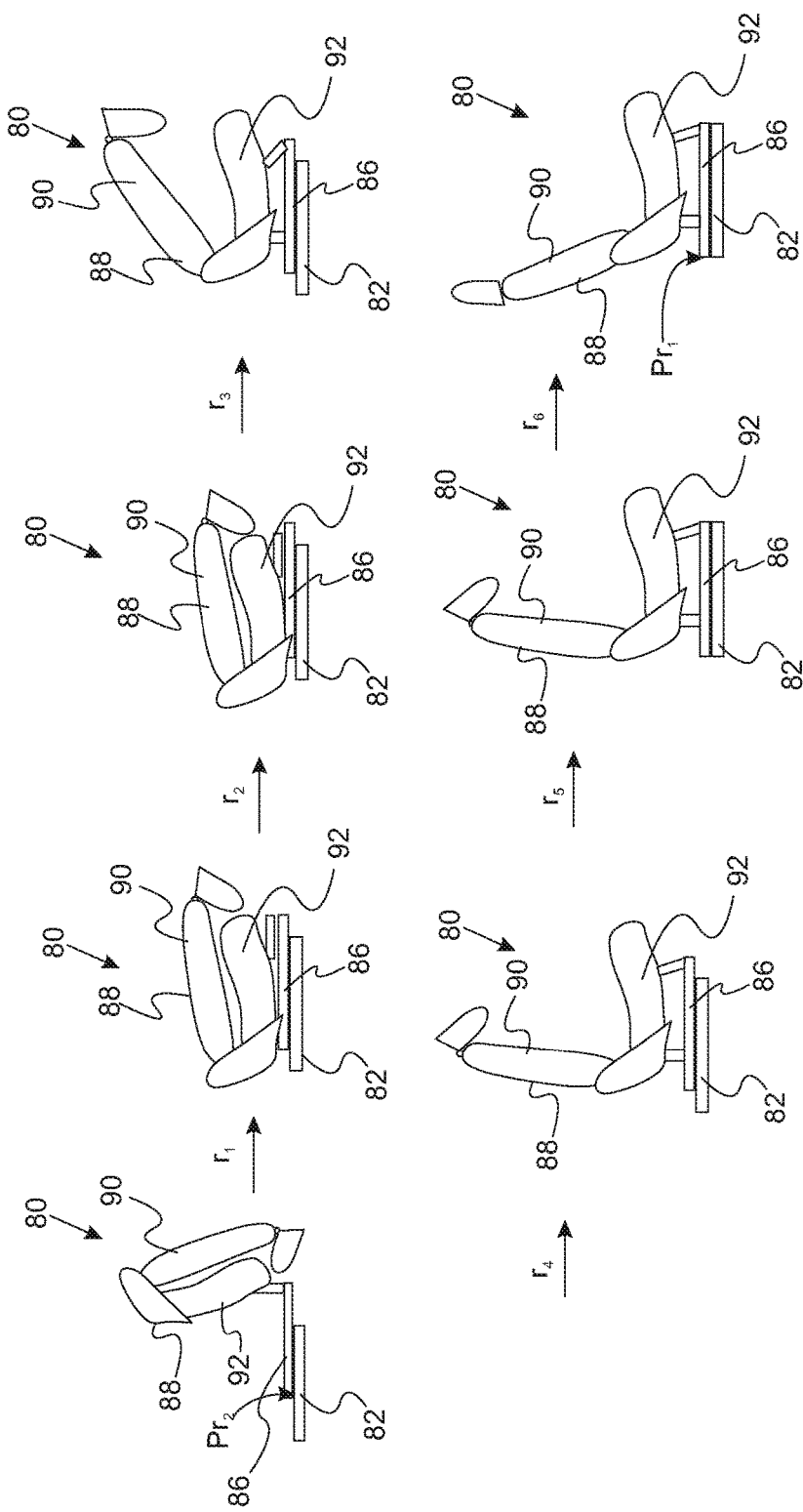
FIG. 4B is a schematic flowchart that illustrates rearward motion of a rear seat using the linear actuator of FIGS. 1 and 2.

FIG. 4A is a schematic flowchart that illustrates forward motion of a rear seat using the linear actuator set forth above. In step $f_1$), vehicle seat 88 of vehicle seating system 80 includes vehicle seatback 90 which starts to slide forward from position $Pr_1$ to an angle of about 60 degrees with second track 86 being unlocked freely slide forward relative to first track 82. In step $f_2$), the seatback 90 continues to rotate forward with second track 86 moving to the fully forward position $Pr_2$. In step $f_3$), the seatback 90 continues to rotate forward for example to an angle of 35 degrees. In step $f_4$), the seatback 90 continues to rotate to a fully forward position (e.g., about 3.44 degrees). In step $f_5$), the seat bottom 92 is disengaged from second track 86. In step $f_6$), the folded seat is fully tumbled forward. FIG. 4B is a schematic flowchart that illustrates rearward motion of a rear seat using the linear actuator set forth above. In step $r_1$), fully tumbled folded vehicle seat 88 which is positioned at fully forward position $Pr_1$ is rotated such that seat bottom 92 engages second track 86. In step $r_2$), the seatback 90 starts to rotate to the upright position. In step $r_3$), the seatback 90 continues to rotate to the upright position. In step $r_4$), the seatback 90 continues to rotate to the upright position with second track 86 being unlocked. In step r₅), the second track 86 with the vehicle seat attached thereto slides to the rearward position. In step r₆), the second track 86 with the vehicle seat attached thereto arrives at rearward position Pr1.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An actuator assembly comprising:
   an actuation cable having a first end and a second end;
   an actuation gear unit having an output gear with a spool feature attached to the first end of the actuation cable, the output gear rotating about a first axis, the actuation cable partially windable upon the spool feature, wherein the output gear has a support section having a peripheral edge with a first set of teeth and a second set of teeth arranged about the peripheral edge, the first set of teeth and second set of teeth separated by a predetermined distance to at least partially define the spool feature;
   a first biasing member; and
   an actuator in communication with the actuation gear unit, the actuator rotating the actuation gear unit to wind the actuation cable onto the spool feature when actuated thereby retracting the actuation cable such that the second end moves from a first position to a second position, wherein the first biasing member biases the actuation gear unit to unwind.

2. The actuator assembly of claim 1 further comprising a second biasing member attached to the second end of the actuation cable which maintains tension in the actuation cable when the actuator assembly is installed in a vehicle with the second end of the actuation cable attached to a vehicle seat.

3. The actuator assembly of claim 2 wherein the second biasing member is a constant force spring comprising a rolled metal ribbon that is relaxed when the rolled metal ribbon is fully rolled up and wherein a restoring force is created when the rolled metal ribbon is unrolled.

4. The actuator assembly of claim 1 wherein the actuator is an electric motor that does not actuate the actuation gear unit to unwind.

5. The actuator assembly of claim 1 wherein the peripheral edge defines a trench flanked by the first set of teeth and second set of teeth.

6. The actuator assembly of claim 1 further comprising a worm gear that is rotated by the actuator and a drive gear unit that has a pinion gear that engages the actuation gear unit and a drive gear that engages the worm gear wherein the drive gear unit rotates about a second axis.

7. The actuator assembly of claim 6 wherein the drive gear has a pocket that is disposed opposite the pinion gear, the first biasing member being at least partially received in the pocket the drive gear has a set of drive gear teeth that are arranged around the pocket, the drive gear having a rim that is radially disposed about the first axis and that extends away from the pinion gear, the drive gear unit rotatable about a first shaft that has a slot that receives a first end of the first biasing member.

8. The actuator assembly of claim 7 wherein the first biasing member has a second end that is disposed opposite the first end and that engages a pin that extends from the drive gear and wherein the pin is at least partially disposed in the pocket, the drive gear unit rotates about a first axis, and the slot is disposed along the first axis.

9. The actuation assembly of claim 1 further comprising a housing that receives the actuation gear unit.

10. An actuator assembly comprising:
    an actuator;
    an actuation cable having a first end and a second end;
    a worm gear that is rotated by the actuator;
    a drive gear unit that has a pinion gear and a worm wheel gear that engages the worm gear;
    an actuation gear unit having an output gear with a spool feature attached to the first end of the actuation cable, the output gear engaging the pinion gear, the output gear rotating about a first axis while the drive gear unit rotates about a second axis, the actuation cable partially windable upon the spool feature;
    a first biasing member;
    an actuator in communication with the actuation gear unit, the actuator rotating the actuation gear unit to wind the actuation cable onto the spool feature when actuated thereby retracting the actuation cable such that the second end moves from a first position to a second position, wherein the first biasing member biases the actuation gear unit to unwind the actuation cable; and
    a second biasing member attached to the second end of the actuation cable which maintains tension in the actuation cable when the actuator assembly is installed in a vehicle with the second end of the actuation cable attached to a vehicle seat.

11. The actuator assembly of claim 10 wherein the second biasing member is a constant force spring comprising a rolled metal ribbon that is relaxed when the rolled metal ribbon is fully rolled up and wherein a restoring force is created when the rolled metal ribbon is unrolled.

12. The actuation assembly of claim 10 further comprising a housing that receives the actuation gear unit, drive gear unit, and the worm gear.

13. A vehicle seating system comprising:
    a first track to be fixed to a vehicle;
    a second track movably attached to the first track;
    a vehicle seat attached to the second track;
    an actuator assembly fixed to the first track, the actuation assembly moving the second track relative to the first track when actuated, the actuation assembly including:
    an actuation cable having a first end and a second end;
    an actuation gear unit having an output gear with a spool feature attached to the first end of the actuation cable, the output gear rotating about a first axis, the actuation cable partially windable upon the spool feature;
    a first biasing member;
    a second biasing member attached to the second end of the actuation cable and to the vehicle seat to maintain tension in the actuation cable; and
    an actuator in communication with the actuation gear unit, the actuator when actuated rotating the actuation gear unit to wind the actuation cable onto the spool feature thereby retracting the actuation cable from a first position to a second position, wherein the first biasing member biases the actuation gear unit to move the actuation cable from the second position to the first position.

14. The vehicle seating system of claim 13 wherein the second biasing member is a constant force spring comprising a rolled metal ribbon that is relaxed when the rolled metal ribbon is fully rolled up and wherein a restoring force is created when the rolled metal ribbon is unrolled.

15. The vehicle seating system of claim 13 wherein the output gear has a support section having a peripheral edge with a first set of teeth and a second set of teeth arranged about the peripheral edge, the first set of teeth and second set of teeth separated by a predetermined distance to at least partial define the spool feature.

16. The vehicle seating system of claim 15 wherein the peripheral edge defines a trench flanked by the first set of teeth and second set of teeth.

17. The vehicle seating system of claim 13 further comprising a worm gear that is rotated by the actuator and a drive gear unit that has a pinion gear that engages the actuation gear unit and a worm wheel gear that engages the worm gear wherein the drive gear unit rotates about a second axis.

18. The vehicle seating system of claim 17 wherein the drive gear unit has a pocket that is disposed opposite the pinion gear, the first biasing member being at least partially received in the pocket the drive gear unit has a set of drive gear teeth that are arranged around the pocket.

19. The vehicle seating system of claim 13 further comprising a user operated switch to initiate movement of the second track.

* * * * *